UNITED STATES PATENT OFFICE 2,106,353

PROCESS FOR THE PREPARATION OF HALOGENATED ORGANIC HYDROXY COMPOUNDS

Siegfried Leonard Langedijk, Amsterdam, Netherlands, assignor to Shell Development Company, San Francisco, Calif., a corporation of Delaware No Drawing. Application July 21, 1932, Serial No. 623,903. In the Netherlands July 25, 1931

7 Claims. (Cl. 260—157)

This invention relates to the preparation of halogenated organic hydroxy compounds, such as the halohydrines, wherein a hydroxyl group and a halogen atom are linked to different carbon atoms of an aliphatic radical.

Various processes are known for the preparation of additive compounds of hypohalogenous acids, such as hypochlorous or hypobromous acid, with organic compounds having two or more unsaturated carbon atoms in the molecule. According to these known processes, the additive compounds are generally prepared either with the aid of free hypochlorous or hypobromous acid, or with the aid of mixtures of chlorine or bromine and water. These substances are then caused to react in diluted condition with the unsaturated compounds.

There are various objections to the known processes, which, for the greater part, may be summarized as follows:

When causing chlorine or bromine to react with water, halogen hydrides are formed, which hinder the formation of hypochlorous acid and hypobromous acid. As a result, free halogen comes to be present in the solution according to the reaction: $HHal + HOHal \rightarrow H_2O + Hal_2$, giving rise to the formation of a dihalogenide with the unsaturated organic material instead of the desired additive compounds of hypochlorous acid and hypobromous acid. In those cases where it is yet possible by means of some special contrivances to prepare a concentrated solution of hypochlorous acid or hypobromous acid, such solution is very unstable, which makes it very difficult to work with.

I have found that the above-mentioned objections are practically entirely removed when an ester of a hypohalogenous acid is caused to react, in the presence of water, with an organic compound having two or more unsaturated carbon atoms in the molecule. The preparation of the additive products is effected according to the following equation when unsaturated compounds are employed.

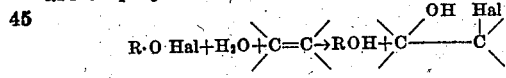

For tertiary butyl hypochlorite and ethylene, the equation becomes as follows:

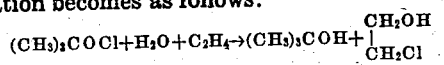

The ester radical may be of a primary character as the methyl, ethyl, n. propyl or n. butyl and other primary homologues, or may be of a secondary character as the isopropyl, secondary butyl, secondary amyl or secondary hexyl and higher secondary homologues or may be, preferably, of a tertiary character as the tertiary butyl, tertiary amyl or tertiary hexyl and higher homologues. The above aliphatic radicals may be linked to carbocyclic and heterocyclic nuclei.

It is preferable to operate with tertiary esters of hypohalogenous acids as they are the most stable of the hypohalite esters; therefore, for illustrative purposes only, reference will be had to the preferred embodiment of the invention of which tertiary butyl hypohalite is exemplary, although it is to be understood that in certain instances, it may be preferable to employ primary or secondary esters of a hypohalogenous acid at relatively low temperatures and with or without the use of inert solvents or stabilizers.

The advantages of the process, according to the invention, lie in the fact that it is possible to prepare with comparatively small quantities of water, a concentrated halohydrine solution which does not contain any free hydrogen halide, cannot be decomposed, as is the case with a concentrated HOCl or HOBr solution, and in which alcohol is present as the only by-product. The presence of the alcohol further does not hinder the reaction. The said alcohol can be recovered by any of the known methods, and used again for the preparation of an ester of a hypohalogenous acid.

It is not necessary to start from an ester of a hypohalogenous acid in a pure state, it being also possible to use in the preparation of the additive compounds the reaction mixture in which the ester of the hypohalogenous acid is formed.

As an alternative procedure, one can bring an alcohol, other than methyl, into reactive contact with an ester of a hypohalogenous acid and in the presence of an aqueous medium. For example, if 0.25 mol. of tertiary butanol is boiled for 2 hours in a flask under a reflux condenser with 0.25 mol. tertiary butyl hypochlorite in the presence of water, tertiary butyl chlorhydrin is formed.

When the reaction is carried out with alcohol instead of an unsaturated carbon compound, the reaction mixture in which the hypohalite ester is formed may be utilized.

It is frequently advantageous to have the reaction take place at temperatures below room temperature, in order to prevent side-reactions. However, I have obtained substantially quantitative yields of halohydrines by operating with temperatures as high as 45° C. at normal pressures with unsaturated organic compounds, water and a hypohalite ester.

Halohydrines are formed quantitatively if the corresponding unsaturated compounds are allowed to react with hypohalite esters in the presence of water while being vigorously stirred. The order of introduction may be varied to suit the individual operator's taste. If the hypohalite ester is free from elementary halogen when hydrolysis takes place, only the halogenated organic hydroxy compound is obtained. Part of the halohydrines can be isolated as such from the reaction mixture if they are salted out after distillation.

The reaction proceeds more quickly with unsaturated organic compounds containing a tertiary carbon atom, i. e. a carbon atom which is unsaturated with respect to its valence and which is not linked to hydrogen, than with unsaturated organic compounds containing a secondary carbon atom, i. e. a carbon atom which is unsaturated with respect to its valence and which is linked to only one atom of hydrogen. It is for this reason that the reaction proceeds faster with higher yields with trimethyl ethylene than with n. amylene.

The esters of tertiary alcohols with hypohalogenous acids, as hypochlorous or hypobromous acid, can be prepared in a known manner, for example, by passing chlorine or bromine into a mixture of water, tertiary alcohol and alkali hydroxide or another substance with basic reaction while cooling, whereby the ester is separated practically quantitatively as an upper layer on the reaction liquid. In the preparation of the primary and secondary esters of hypohalogenous acids, greater precautions as to stabilizing agents and temperatures must be observed in view of their unstability and tendency to explode.

The physical state of the components of the reaction may be varied so that the process is conducted in a liquid or mixed vapor-liquid phase.

In the process, according to the invention, tertiary butyl alcohol, tertiary amyl alcohol, tertiary hexyl alcohol and the like, may for example be taken into consideration as tertiary alcohols as mixed alcohols which contain a primary or secondary alcohol grouping besides the tertiary alcohol grouping. As unsaturated organic compounds may be mentioned, for instance aliphatic olefines (ethylene, propylene, butylene, amylene and the like) cyclic olefines, including terpenes (cyclohexene, pinene and the like), diolefines (isoprene and the like); further substances such as, acetylene, or its homologues such as pentines, oleic acid, cinnamic acid, eugenol, isoeugenol, citral, allyl alcohol, crotonic acid, styrene, menthene, stilbene, cinnamyl alcohol, acrolein, furfural, cinnamaldehyde, mesityl oxide, benzalacetone, acrylic acid, propiolic acid, elaidic acid, maleic acid, coumaric acid, maleic acid anydride, coumarin, cinnamanilide, unsaturated purines as caffein, uric acid, theophyllin, etc. It is to be understood that according to the course of the reaction of the hypohalite esters with any of the above unsaturated compounds, compounds like benzene, naphthalene, and the like, are not to be considered as unsaturated hydrocarbons since they behave, according to applicant's process, as paraffine hydrocarbons.

*Example I*

0.25 mol. tertiary butyl hypochlorite (above 27 kgs.) and 150 liters water are brought into a vessel provided with a gas-tight stirrer, a thermometer and a sieve-plate for the introduction of gas, whereupon ethylene is introduced at a temperature of about 18–22° C. About 5.5 cubic meters of the ethylene is absorbed, which is in conformity with the theoretical quantity. Then the watery layer is distilled. At first a constant boiling mixture of tertiary butyl alcohol, ethylene chlorhydrine and water is passed over thereby, and next a constant boiling mixture of ethylene chlorhydrine and water. The chlorhydrine is recovered from the distillates by conventional methods known to the art. Although the yield is about 95% in the present case, I have realized yields greater than 95% of the theoretical.

*Example II*

¼ mol. of tertiary butyl alcohol (18.5 grams) of 95% (the rest being water), and ¼ mol. of tertiary butyl hypochlorite (27 grams) are boiled together for 2 hours, under application of a reflux-cooler. At the end of the process hypochlorite could no longer be traced in the reaction product. The reaction mixture was completely soluble in a fivefold quantity by volume of water. The following fractions were obtained by distillation:

1. Boiling between 73 and 84° C.:
   19.1 grams=tert. but. alc.
2. 84 and 110° C.:
   9.7 grams=transitional fraction
3. 110 and 135° C.:
   15 grams=isobutylene chlorhydrine.

The reaction probably took place as follows:
The tertiary butyl alcohol gave rise to the formation of isobutylene and water, whilst the isobutylene formed was converted with water and tertiary butyl hypochlorite into isobutylene chlorhydrine and tertiary butylalcohol. In fact water-free tertiary butyl alcohol and pure hypochlorite when heated in the same ratio in the absence of water, give rise to the formation of tertiary butyl alcohol, acetone, methyl chloride and a little chlorhydrine. Further when boiling ¼ mol. of tertiary butyl hypochlorite with ½ cc. water for 24 hours, only traces of chlorhydrine are formed, the main product being tertiary butyl alcohol. Thus water has not a converting, but a practically exclusively hydrolyzing action on the hypochlorite.

*Example III*

Into a vessel provided with a gas-tight stirrer, a thermometer and a sieve plate for the introduction of gas, is passed ¼ kg. mol. of tertiary butyl hypochlorite (abt. 27 kgs.) and 150 litres of water, whereupon propylene is introduced at temperatures between 18 and 42° C. (the temperature rises during the reaction). About 5½ cubic meters thereof is absorbed, which approximately corresponds to the theoretical quantity. No separation of propylene chloride takes place. The watery layer is distilled, whereby first a constant boiling mixture of tertiary butyl alcohol, propylene chlorhydrine and water, and then a constant boiling mixture of propylene chlorhydrine and water passes over. The chlorhydrine is separated from the distillates in known manner. The yield is about 95%.

The process can be executed in a batch, intermittent or continuous manner. A continuous procedure may be adopted via the intermediate formation of a hypohalite ester, viz. by simultaneously bringing into a mixture of an alcohol, preferably a tertiary alcohol for reasons set out heretofore, water and a weakly alkaline-reacting substance, chlorine or bromine and the unsaturated organic compound, and continuously removing the additive compound obtained. Alternatively the unsaturated organic compound may be introduced with the water.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for the preparation of halohydrins comprising reacting an unsaturated open chain organic compound containing a tertiary carbon atom possessing a double bond in an olefinic linkage with a hypohalite ester containing an alkyl group contiguous to the hypohalogenous acid radical, in the presence of water.

2. A process for the preparation of chlorohydrins comprising reacting an open chain tertiary olefine with a hypochlorite ester containing an alkyl group contiguous to the hypohalogenous acid radical, in the presence of water.

3. A process for the preparation of chlorohydrins comprising reacting an unsaturated organic compound containing at least one double bond in an olefinic linkage with a hypochlorite ester containing an alkyl group contiguous to the hypohalogenous acid radical in the presence of sufficient water to obtain a halohydrin, said reaction being conducted in the substantial absence of added free halogen and of free acid.

4. A process for the preparation of halohydrins which comprises reacting an organic compound possessing an unsaturated aliphatic linkage with a hypohalite ester containing an alkyl group contiguous to the hypohalogenous acid radical in the presence of water, but in the substantial absence of free acid.

5. A process for the preparation of halohydrins which comprises reacting an organic compound possessing an olefinic linkage with a hypohalite ester containing an alkyl group contiguous to the hypohalogenous acid radical, in the presence of water, but in the substantial absence of free acid.

6. A process for the preparation of halohydrins which comprises reacting an olefine with a hypohalite ester containing an alkyl group contiguous to the hypohalogenous acid radical, in the presence of water but in the substantial absence of free acid.

7. A process for the preparation of chlorohydrins which comprises reacting an olefine with a hypochlorite ester containing an alkyl group contiguous to the hypochlorous acid radical, in the presence of water but in the substantial absence of free acid.

SIEGFRIED LEONARD LANGEDIJK.